(12) United States Patent
Vetters et al.

(10) Patent No.: US 10,273,818 B2
(45) Date of Patent: Apr. 30, 2019

(54) GAS TURBINE ENGINE WITH COMPLIANT LAYER FOR TURBINE VANE ASSEMBLIES

(71) Applicants: Rolls-Royce North American Technologies, Inc., Indianapolis, IN (US); Rolls-Royce Corporation, Indianapolis, IN (US)

(72) Inventors: Daniel K. Vetters, Indianapolis, IN (US); Jack D. Petty, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 336 days.

(21) Appl. No.: 15/130,060

(22) Filed: Apr. 15, 2016

(65) Prior Publication Data
US 2017/0298748 A1 Oct. 19, 2017

(51) Int. Cl.
| | | |
|---|---|---|
| F01D 9/04 | (2006.01) | |
| F01D 25/00 | (2006.01) | |
| F01D 5/28 | (2006.01) | |
| F01D 25/24 | (2006.01) | |

(52) U.S. Cl.
CPC ............ *F01D 9/041* (2013.01); *F01D 5/284* (2013.01); *F01D 9/042* (2013.01); *F01D 25/005* (2013.01); *F01D 25/246* (2013.01); *F05D 2220/32* (2013.01); *F05D 2230/60* (2013.01); *F05D 2230/642* (2013.01); *F05D 2240/12* (2013.01); *F05D 2260/941* (2013.01); *F05D 2300/10* (2013.01); *F05D 2300/50212* (2013.01); *F05D 2300/6033* (2013.01)

(58) Field of Classification Search
CPC . F01D 9/041; F01D 9/042; F01D 9/04; F01D 5/284
See application file for complete search history.

(56) References Cited

U.S. PATENT DOCUMENTS

| | | |
|---|---|---|
| 651,404 A | 6/1900 | Williams |
| 6,808,363 B2 | 10/2004 | Darkins, Jr. et al. |
| 7,090,459 B2 | 8/2006 | Bhate et al. |
| 7,258,942 B2 | 8/2007 | Chou et al. |

(Continued)

FOREIGN PATENT DOCUMENTS

| | | |
|---|---|---|
| JP | 62-41903 A | 2/1987 |
| JP | 08-226304 A | 9/1996 |

OTHER PUBLICATIONS

3M Interam Thermal and Emissions Solutions Product Product Overview; 2008.

(Continued)

*Primary Examiner* — Richard A Edgar
*Assistant Examiner* — Michael L Sehn
(74) *Attorney, Agent, or Firm* — Barnes & Thornburg LLP

(57) ABSTRACT

A turbine vane assembly for use in a gas turbine engine includes an endwall, a flow path component, and a load-distribution system. The endwall is arranged around a central axis of the turbine vane assembly. The flow path component is configured to direct fluid flow through the turbine vane assembly. The load-distribution system is positioned between the endwall and the flow path component to distribute loads transmitted between the endwall and the flow path component.

20 Claims, 6 Drawing Sheets

(56) References Cited

U.S. PATENT DOCUMENTS

| | | | |
|---|---|---|---|
| 7,497,443 B1 | 3/2009 | Steinetz et al. | |
| 7,824,152 B2 * | 11/2010 | Morrison | F01D 9/042 415/135 |
| 8,132,442 B2 | 3/2012 | Merrill et al. | |
| 2004/0120811 A1 * | 6/2004 | Darkins, Jr. | F01D 9/042 415/191 |
| 2008/0279679 A1 | 11/2008 | Morrison | |
| 2014/0250893 A1 | 9/2014 | Chan et al. | |

OTHER PUBLICATIONS

Extended European Search Report, European Application No. 17165050.0-1610, dated Aug. 18, 2017, 9 pages.
Ennos, A. R. (2012) Solid Biomechanics. Princeton, Ney Jersey: Princeton University Press (pp. 3-25, see p. 8).
European Office Action dated May 31, 2018 and issued in connection with EP Patent Application No. 17165050.0.

* cited by examiner

GAS TURBINE ENGINE WITH COMPLIANT LAYER FOR TURBINE VANE ASSEMBLIES

FIELD OF THE DISCLOSURE

The present disclosure relates generally to gas turbine engines, and more specifically to turbine vane assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion reaction are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, the blades push air axially toward an aft end of the engine. The rotating wheel assemblies also cause the air to move radial, or swirl, about a central axis of the engine as the air is pushed toward the aft end. The static vane assemblies are arranged between the rotating wheel assemblies to re-direct the radially moving, or swirling, component of the air to the axial direction.

Some vane assemblies are formed by a number of flow path components arranged circumferentially adjacent to one another to form a hoop and a plurality of endwalls arranged around the hoop of flow path components. Such vane assemblies sometimes include components having different rates of thermal expansion which may cause the components to experience areas of localized stress during heating and cooling of the vane assemblies.

SUMMARY

The present disclosure may comprise one or more of the following features and combinations thereof.

A turbine vane assembly for use in a gas turbine engine may include a metallic outer endwall, a flow path component, an outer compliant member, and a plurality of outer load pads. The metallic outer endwall may be arranged around at least a portion of a central axis of the turbine vane assembly. The outer endwall may have a first mating surface facing radially-inward toward the central axis. The flow path component may include ceramic material and may have a second mating surface facing radially-outward away from the central axis and arranged to face the first mating surface. The second mating surface may be spaced apart from the first mating surface to define an outer gap therebetween.

The outer compliant member may be located in the outer gap between the first and second mating surfaces. The outer compliant member may be configured to compress to reduce a size of the outer gap in response to pressure loads acting on the outer endwall and the flow path component and to distribute the pressure loads between the first mating surface of the outer endwall and the second mating surface of the flow path component during use of the turbine vane assembly. The plurality of outer load pads may be located in the outer gap between the first and second mating surfaces. The plurality of outer load pads may be rigid and may have a first load-pad thickness to limit relative movement between the first mating and second mating surfaces to maintain a minimum distance between the first and second mating surfaces. The minimum distance may be greater than or equal to the first load-pad thickness.

In some embodiments, the turbine vane assembly may include a metallic inner endwall arranged around at least a portion of the central axis of the turbine vane assembly. The inner endwall may include a third mating surface facing radially-outward away from the central axis. The flow path component may further include a fourth mating surface facing radially-inward toward the central axis and arranged to face the third mating surface. The fourth mating surface may be spaced apart from the third mating surface to define an inner gap therebetween.

In some embodiments, the turbine vane assembly may include an inner compliant member located in the inner gap between the third and fourth mating surfaces. The inner compliant member may be configured to compress to reduce a size of the inner gap in response to loads acting on the inner endwall and the flow path component during use of the turbine vane assembly.

In some embodiments, the turbine vane assembly may further include a plurality of inner load pads located in the inner gap between the third and fourth mating surfaces. The plurality of inner load pads may be rigid and may have a second load-pad thickness to limit relative movement between the third and the fourth mating surfaces to maintain a minimum distance between the third and fourth mating surfaces.

In some embodiments, the turbine vane assembly further includes a reinforcement spar made from a metallic material. The reinforcement spar may extend from the outer endwall through a hollow core of the flow path component and engage an interior surface of the flow path component so that some aerodynamic loads applied to the flow path component are transferred directly to the outer endwall.

In some embodiments, the flow path component may include an inner flange, an outer flange located in spaced apart relation to the inner flange, and an airfoil extending between and interconnecting the inner and outer flanges. In some embodiments, the plurality of outer load pads may include at least three load pads so that the flow path component is located in three dimensions relative to the metallic outer endwall when both the metallic outer endwall and the flow path component engage the load pads.

According to another aspect of the present disclosure, a turbine vane assembly may include an endwall, a flow path component, and a load-distribution system. The endwall may be arranged around a central axis of the turbine vane assembly. The flow path component may be spaced apart from the endwall. The load-distribution system may be positioned between the endwall and the flow path component. The load-distribution system may be engaged with the endwall and the flow path component and may be configured to distribute loads transmitted between the flow path component and the endwall. The load-distribution system may include a load pad and a compliant member. The compliant member may be configured to compress between an uncompressed thickness to a fully compressed thickness in response to loads transmitted between the endwall and the flow path component and the load pad may be configured to block relative movement between the endwall and the flow path component when the compliant member is compressed to the fully compressed thickness.

In some embodiments, the flow path component may include an inner flange, an outer flange located in spaced apart relation to the inner flange, and an airfoil extending between and interconnecting the inner and outer flanges. The load-distribution system may be positioned between the endwall and one of the inner and outer flanges.

In some embodiments, the compliant member may include a radial inner surface and a radial outer surface spaced apart from the radial inner surface. The compliant member may be formed to include a receiver aperture that extends between the inner and outer radial surfaces and receives the load pad.

In some embodiments, the load pad may include a rigid strip of material arranged in an airfoil shape. In some embodiments, the load pad may be formed to define a compliant-member receiver aperture sized to receive a portion of the compliant member. In some embodiments, the turbine vane assembly may include at least three load pads.

In some embodiments, the turbine vane assembly may further include a reinforcement spar made from a metallic material that extends through the endwall, the compliant member, and a hollow core of the flow path component and engages an interior surface of the flow path component so that some loads applied to the flow path component are transferred directly to the endwall. In some embodiments, the compliant member may be characterized in that a compliance of the compliant member measured in megapascal is greater than that of the endwall and the flow path component.

According to another aspect of the present disclosure, a method of assembling a turbine vane assembly for use in a gas turbine engine may include a number of steps. The method may include locating a first load-distribution system between a flow path component and a first endwall arranged around a central axis of the turbine vane assembly, the first load-distribution system including a compliant member and a rigid load pad, inserting a reinforcement spar through the first endwall and a hollow core of the flow path component to cause the reinforcement spar to engage an interior surface of the flow path component, the reinforcement spar being made from a metallic material, and coupling the reinforcement spar to the first endwall.

In some embodiments, the method may further include locating a second load-distribution system between the flow path component and a second endwall arranged around the central axis of the turbine vane assembly. The second load-distribution system may include a compliant member and a rigid load pad.

In some embodiments, the compliant member may be formed to include a receiver aperture extending through the compliant member. The receiver aperture may be sized to receive the reinforcement spar.

In some embodiments, the rigid load pad may be shaped to extend around a perimeter edge of the receiver aperture. In some embodiments, the receiver aperture may be airfoil shaped.

These and other features of the present disclosure will become more apparent from the following description of the illustrative embodiments.

DETAILED DESCRIPTION OF THE DRAWINGS

Figure 1:
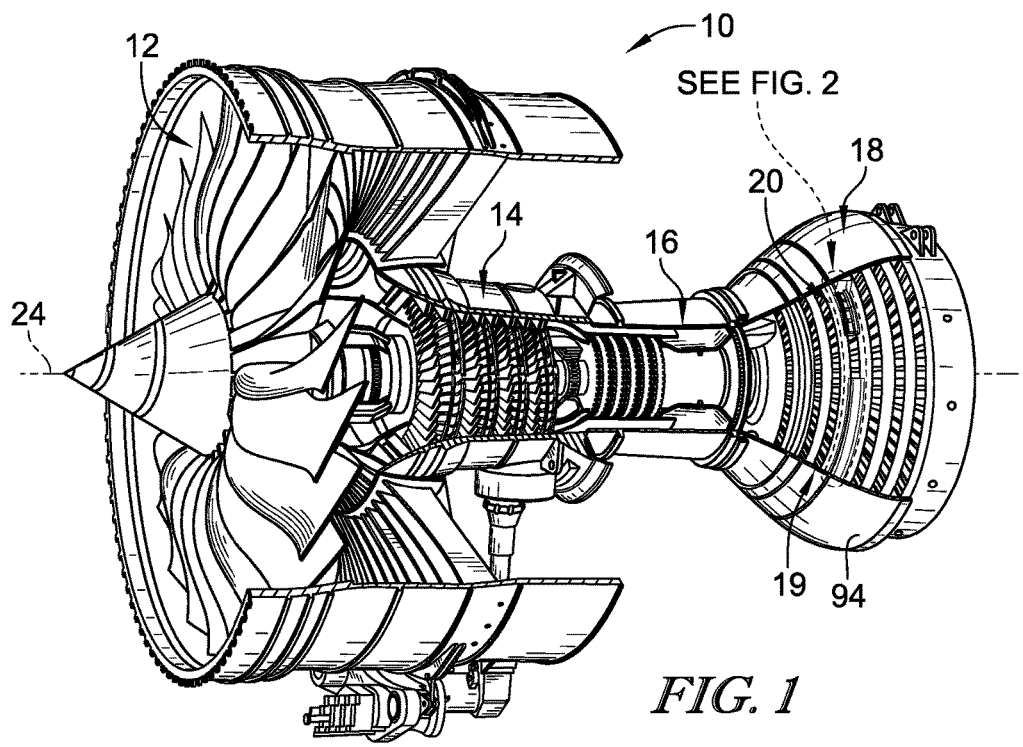
FIG. 1 is a cut-away perspective view of a gas turbine engine including a fan, a compressor, a combustor, and a turbine and showing that the turbine includes a plurality of bladed rotating wheels and a plurality of turbine vane assemblies arranged between the bladed rotating wheels to redirect gasses after interaction with one bladed rotating wheel before interaction with the next bladed rotating wheel.

For the purposes of promoting an understanding of the principles of the disclosure, reference will now be made to a number of illustrative embodiments illustrated in the drawings and specific language will be used to describe the same.

An illustrative aerospace gas turbine engine 10 includes a turbine 18 configured to power the gas turbine engine 10 as shown in FIG. 1. The turbine 18 includes turbine wheel assemblies 19 and a turbine vane assembly 20 arranged between the turbine wheel assemblies 19 as suggested in FIGS. 1 and 2. The turbine vane assembly 20 includes a plurality of assembly segments 22 arranged circumferentially adjacent one another about a central axis 24 of the gas turbine engine 10 to form a full-hoop turbine vane assembly 20 as suggested in FIG. 2.

Figure 2:
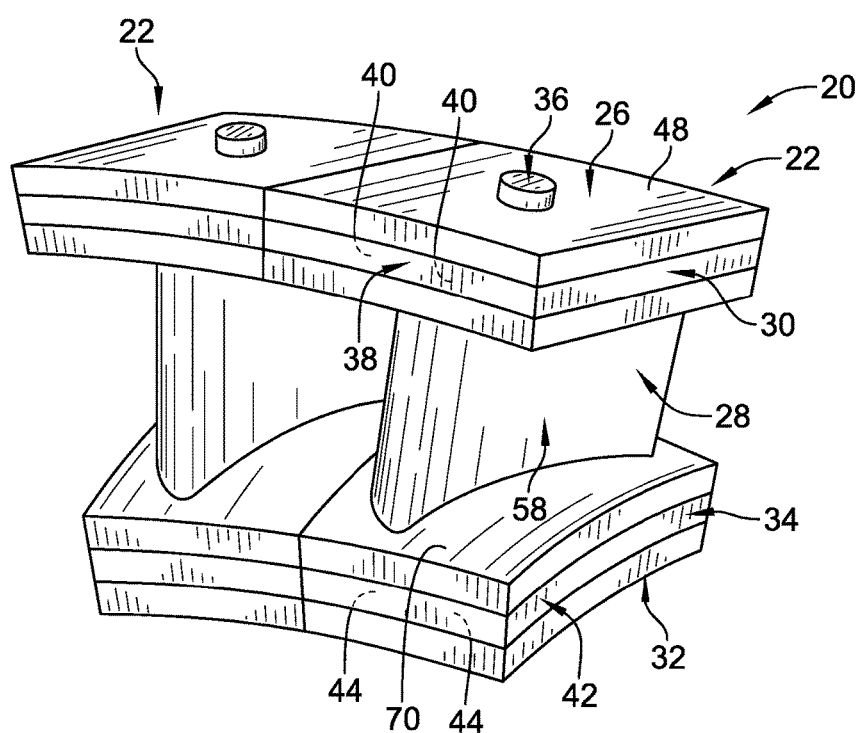
FIG. 2 is a perspective view of a portion of one of the static vane assemblies of FIG. 1 suggesting that the turbine vane assembly includes components with different rates of thermal expansion which may cause the components to experience areas of localized stress during operation of the engine.
Figure 3:
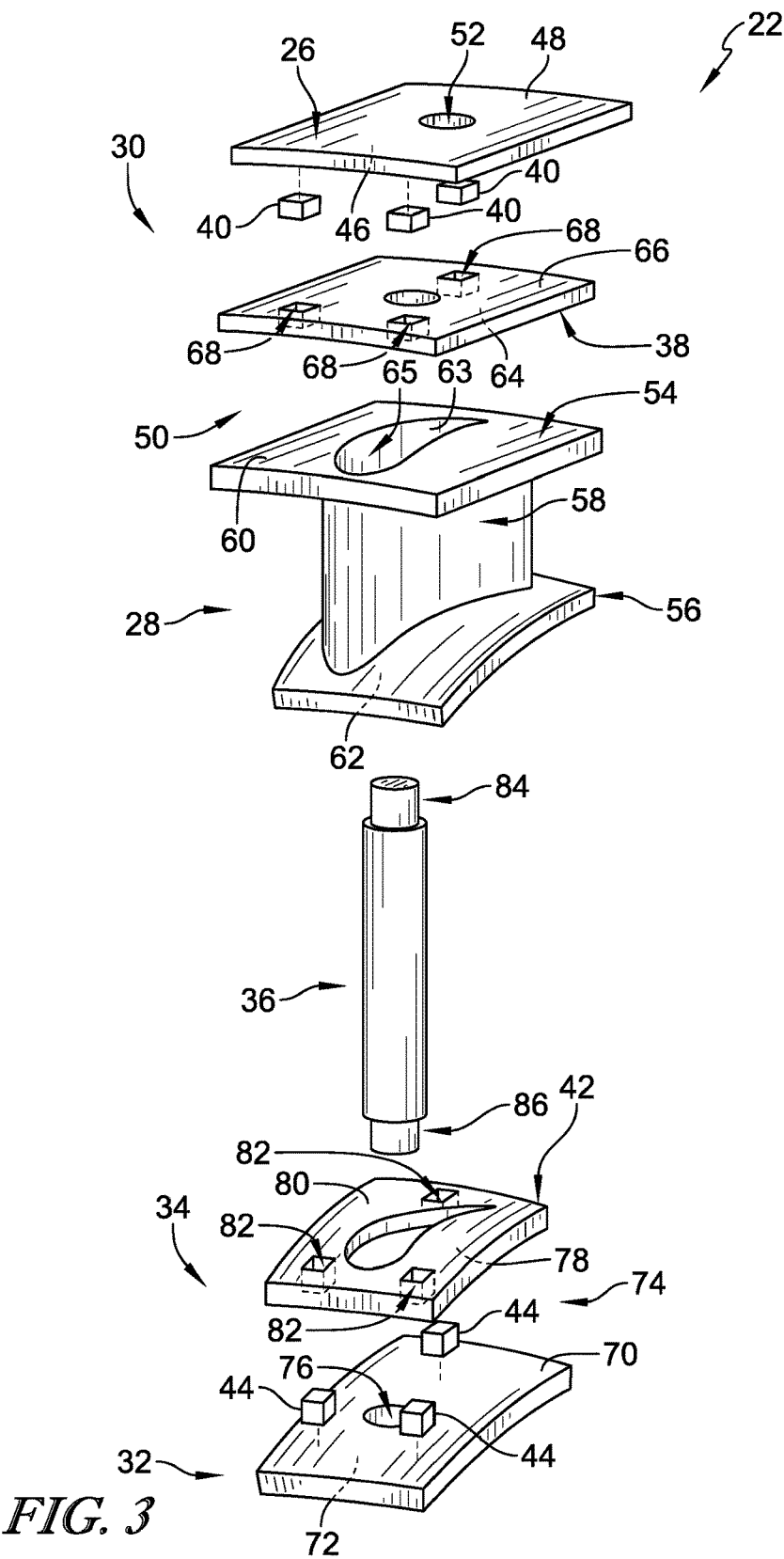
FIG. 3 is an exploded perspective view of a portion of a turbine vane assembly adapted for use in the gas turbine engine of FIG. 1, the turbine vane assembly includes an outer endwall, an outer load-distribution system, a flow path component, a reinforcement spar, an inner load-distribution system, and an inner endwall, the load-distribution systems configured to distribute forces between the endwalls and the flow path component to lower any areas of localized stress in the flow path component.
Figure 4A:
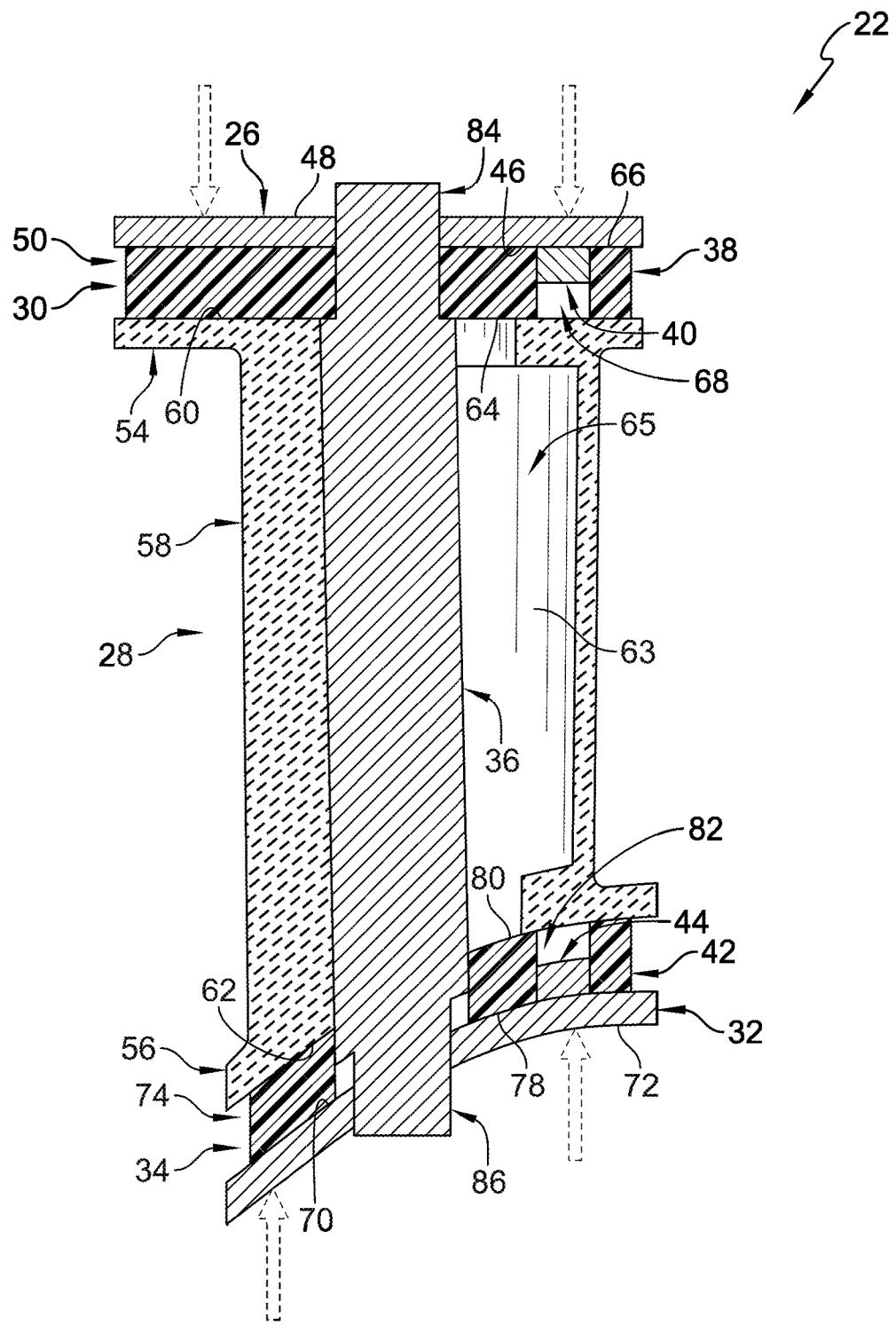
FIG. 4A is sectional view of a portion of the turbine vane assembly of FIG. 2 showing the load-distribution systems positioned between the endwalls and the flow path component and further showing that each load-distribution system includes a compliant member and a rigid load pad.
Figure 4B:
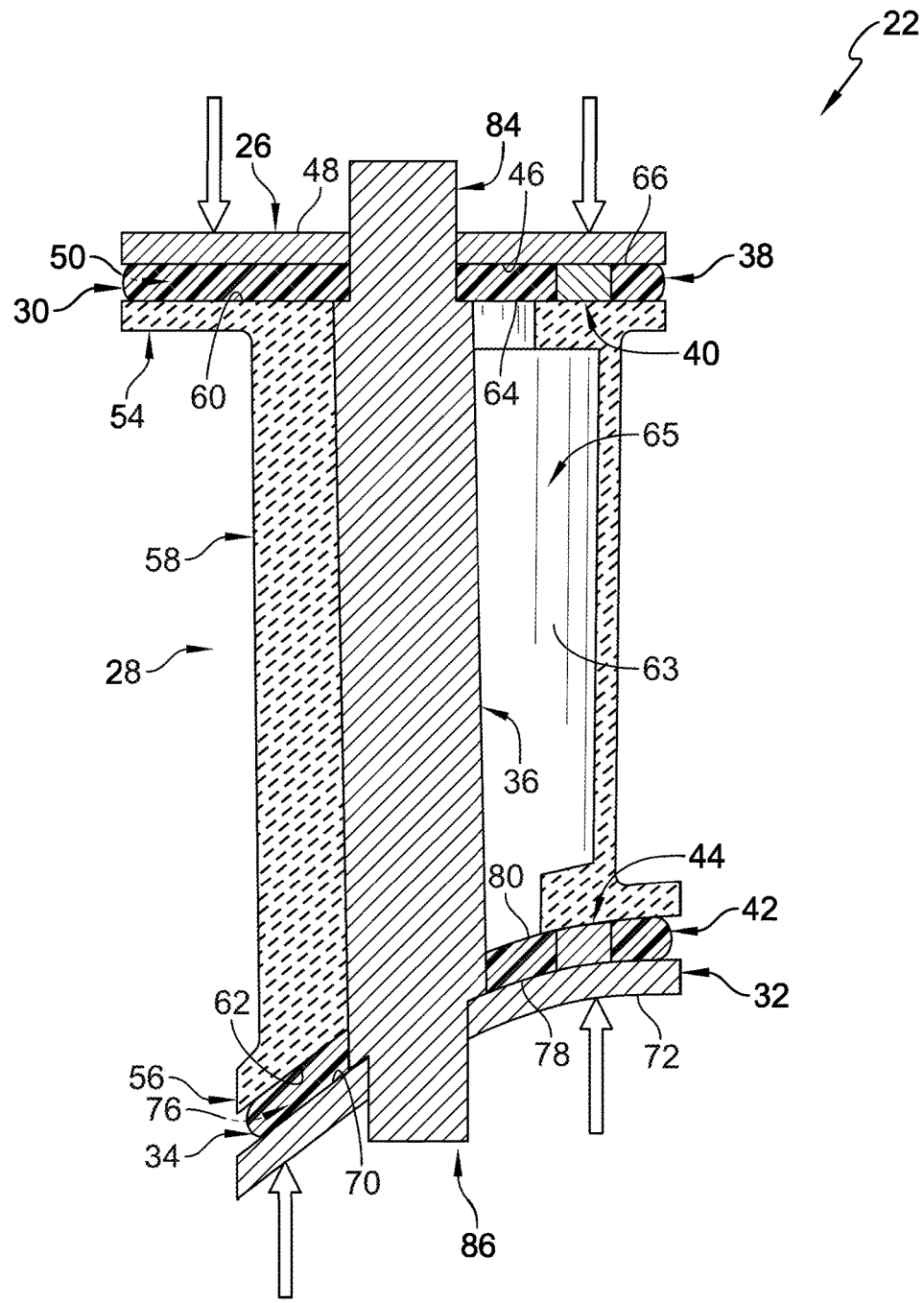
FIG. 4B is a sectional view similar to FIG. 4A showing the compliant members fully compressed to cause the rigid load pads to engage the endwalls and the flow path component to transmit forces between the flow path component and the endwalls at predetermined locations.

The illustrative vane assembly 20 includes a flow path component 28 located between two endwalls 26, 32 as shown in FIGS. 2 and 3. The illustrative endwalls 26, 32 comprise metallic materials while the flow path component 28 comprises ceramic materials as shown in FIGS. 4A and 4B. As such, the endwalls 26, 32 and the flow path component 28 may have different rates of thermal expansion which cause the endwalls 26, 32 and the flow path component 28 to grow relative to one another during operation of the engine 10. Relative growth between the endwalls 26, 32 and the flow path component 28 may cause areas of localized stress in the ceramic flow path component 28 which may damage and/or break the ceramic flow path component 28. The vane assembly 20 further includes load-distribution systems 30, 34 located between the flow path component 28 and the endwalls 26, 32 to distribute loads across the flow path component 28 to lower any areas of localized stress.

Each load-distribution system 30, 34 includes a compliant member 38, 42 and a rigid load pad 40, 44 as shown in FIG. 3. The compliant member 38, 42 is configured to deform and compress to distribute pressure loads between the endwalls 26, 32 and the flow path component 28. Each load pad 40, 44 is configured to block relative movement between the endwalls 26, 32 and the flow path component 28 in response to the corresponding compliant member 38, 42 being fully compressed. As a result, the compliant members 38, 42 distribute a first portion of the loads and the load pads 40, 44 distribute a second portion of the loads if the pressure loads are relatively large.

The illustrative aerospace gas turbine engine 10 includes a fan 12, a compressor 14, a combustor 16, and the turbine 18 as shown in FIG. 1. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about the central axis 24 of the engine 10 and drive the compressor 14 and the fan 12. The turbine 18 includes the turbine wheel assembly 19 and the turbine vane assembly 20 as suggested in FIG. 1.

In the illustrative embodiment, each assembly segment 22 includes the outer endwall 26, the flow path component 28, the outer load-distribution system 30, the inner endwall 32, and the inner load-distribution system 34 as shown in FIGS. 2 and 3. The endwalls 26, 32 are configured to support the flow path component 28 in position about the central axis 24. The flow path component 28 is arranged between the rotating turbine wheel assemblies 19 to re-direct gasses moving through the turbine 18. The load-distribution systems 30, 34 are positioned between the endwalls 26, 32 and the flow path component 28 to distribute forces transmitted between the endwalls 26, 32 and the flow path component 28 as suggested in FIGS. 4A and 4B. Illustratively, the assembly segment 22 further includes a reinforcement spar 36.

The outer endwall 26 may be adapted to couple the turbine vane assembly 20 with a turbine case 94 included in the turbine 18 as suggested in FIG. 1. The outer endwall 26 includes a radially inwardly-facing mating surface 46 and a radially outwardly-facing surface 48 spaced apart from the radially inwardly-facing mating surface 46 as shown in FIG. 3. The radially inwardly-facing mating surface 46 is arranged to face a radially outwardly facing mating surface 60 of the flow path component 28 as shown in FIGS. 3, 4A, and 4B. The outer endwall 26 is spaced apart from the flow path component 28 to form an outer gap 50 between the radially inwardly-facing mating surface 46 of the outer endwall 26 and the radially outwardly-facing mating surface 60 of the flow path component 28.

In the illustrative embodiment, the outer endwall 26 is formed to include a receiver aperture 52 that extends between the radially inwardly-facing and radially outwardly facing mating surfaces 46, 48 of the outer endwall 26 as shown in FIG. 3. The receiver aperture 52 is sized to receive an outer end 84 of the reinforcement spar 36 as shown in FIGS. 4A and 4B.

The flow path component 28 includes an outer flange 54, an inner flange 56, and an airfoil 58 extending between and interconnecting the outer and inner flanges 54, 56 as shown in FIG. 3. The outer and inner flanges 54, 56 extend circumferentially outward away from the airfoil 58. The outer flange 54 is formed to include a radially outwardly-facing mating surface 60 arranged to face the radially inwardly-facing mating surface 46 of the outer endwall 26 as shown in FIGS. 3, 4A, and 4B. The inner flange 56 is formed to include a radially inwardly-facing mating surface 62 arranged to face a radially outwardly-facing mating surface 70 of the inner endwall 32.

The airfoil 58 is shaped to redirect air flowing through the turbine 18 as suggested in FIGS. 2 and 3. When the rotating turbine wheel assemblies 19 turn, they push air axially toward an aft end of the engine 10. The rotating turbine wheel assemblies 19 also cause the air to move radial, or swirl, about the central axis 24 of the engine 10 as the air is pushed toward the aft end. The airfoils 58 are arranged between the rotating turbine wheel assemblies 19 to re-direct the radially moving, or swirling, component of the air to the axial direction. During operation of the gas turbine engine 10, pressure loads acting on the turbine vane assembly 20 may be transferred between the outer flange 54 of the flow path component 28 and the outer endwall 26. Similarly, pressure loads may be transferred between the inner flange 56 of the flow path component 28 and the inner endwall 32.

In the illustrative embodiment, the flow path component 28 is formed to include an interior surface 63 arranged to define a hollow core 65 that extends through the airfoil 58 as shown in FIG. 3. During operation of the engine 10, cooling air may be directed into the hollow core 65 of the flow path component 28. In the illustrative embodiment, the outer flange 54, the inner flange 56, and the airfoil 58 are monolithically formed. In other embodiments, the outer flange, the inner flange 56, and the airfoil may comprise two or more components.

Each flow path component 28 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the flow path components 28 may be made of other metallic, non-metallic, or composite materials with low coefficients of thermal expansion.

Figure 5A:
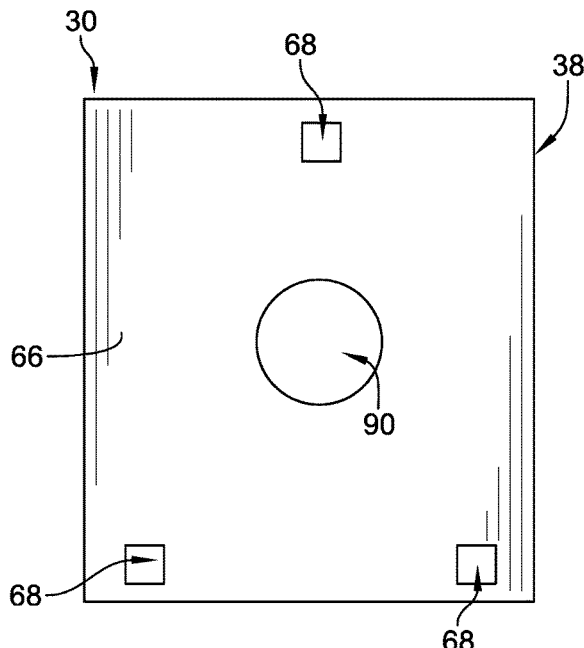
FIG. 5A is an elevation view of the outer compliant member of FIG. 3.
Figure 5B:
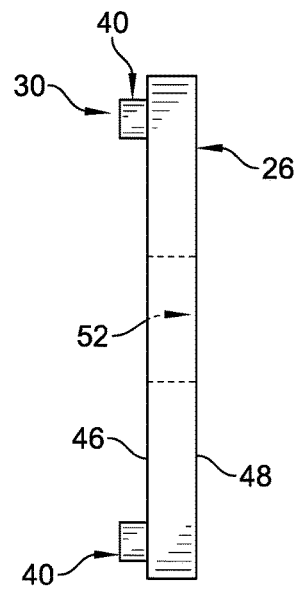
FIG. 5B is a side elevation view of the outer endwall of FIG. 3 and a plurality of load pads configured to be received in the outer compliant member of FIG. 5A.

The outer load-distribution system 30 is configured to be located in the outer gap 50 between the outer endwall 26 and the outer flange 54 of the flow path component 28 as shown in FIGS. 3, 4A, and 4B. The illustrative outer load-distribution system 30 includes the compliant member 38 and the plurality of load pads 40 as shown in FIGS. 5A and 5B. The compliant member 38 is configured to compress when a load is applied to the compliant member 38 to distribute loads transmitted between the mating surface 46 of the outer endwall 26 and the mating surface 60 of the flow path component 28 during use of the turbine vane assembly 20. The load pads 40 are configured to limit movement between the outer endwall 26 and the flow path component 28 and further configured to transmit relatively large forces between the outer endwall 26 and the flow path component 28.

Illustratively, the outer compliant member 38 has a modulus of elasticity in the direction of compression of between about, or specifically, 0.3 MPa to about, or specifically, 20,000 MPa. However, the modulus of elasticity of the outer compliant member 38 may be another suitable value less than the modulus of elasticity of the load pads 40. Illustratively, the modulus of elasticity of the outer compliant member 38 may be another suitable value less than the modulus of elasticity of the endwall 26. Illustratively, the modulus of elasticity of the outer compliant member 38 may be another suitable value less than the modulus of elasticity of the flow path component 28.

The outer compliant member 38 includes an inner radial surface 64 and an outer radial surface 66 spaced apart radially from the inner radial surface 64 as shown in FIG. 3. The inner radial surface 64 is configured to engage the mating surface 60 of the outer flange 54 of the flow path component 28. The outer radial surface 66 is configured to engage the inner mating surface 46 of the outer endwall 26. When no load is applied to the compliant member 38, the compliant member 38 has an uncompressed thickness defined between the inner radial surface 64 and the outer radial surface 66 as shown in FIG. 3.

The illustrative compliant member 38 is formed to include a plurality of receiver apertures 68 as shown in FIG. 5A. Each receiver aperture 68 is shaped to receive one of the load pads 40 as suggested in FIGS. 3, 4A, and 4B. Each receiver aperture 68 extends radially through the compliant member 38 between the inner and outer radial surfaces 64, 66. In the illustrative embodiment, the compliant member 38 is formed to include an aperture 90 sized to receive the spar 36.

In some embodiments, the compliant member 38 comprises micaboard gasket material. In some embodiments, the compliant member 38 comprises 3M™ INTERAM® insulation and erosion reducing material. In some embodiments, one or more of the surfaces of the compliant member 38 are coated. In some embodiments, the compliant member 38 is formed to define air passages that extend through the compliant member 38 axially or circumferentially. In some embodiments, the load-distribution system 30 includes metal foil sheets and the compliant member 38 is positioned between the metal foil sheets.

The load pads 40 are positioned between the mating surfaces 46, 60 as shown in FIG. 3. Each load pad 40 has a thickness that is less than the uncompressed thickness of the compliant member 38 as shown in FIGS. 4A and 4B. In the illustrative embodiment, the load pads 40 are rigid load pads which comprise metallic material, for example, nickel or cobalt based alloys.

In the illustrative embodiment, the outer load-distribution system 30 includes at least three load pads 40 to locate the flow path component 28 in three-dimensional space. As a result, at least three load pads 40 engage the flow path component 28 in response to the compliant member 38 being fully compressed. As such, the load pads 40 create a determinant loading system so that loads are known independent of component tolerances.

In some embodiments, the load pads 40 and the outer endwall 26 are monolithically formed. In other embodiments, the rigid load pads 40 are coupled to the mating surface 46 of the outer endwall 26 as shown in FIG. 5B. In other embodiments, the rigid load pads 40 are coupled to the mating surface 60 of the flow path component 28. In other embodiments, the load pads 40 are not coupled with either the outer endwall 26 or the flow path component 28.

The inner endwall 32 includes a radially outwardly-facing mating surface 70 and a radially inwardly-facing mating surface 72 spaced apart from the radially outwardly-facing mating surface 70 as shown in FIG. 3. The radially outwardly-facing mating surface 70 is arranged to face the radially inwardly-facing mating surface 62 of the inner flange 56 of the flow path component 28 as shown in FIGS. 3, 4A, and 4B. The inner endwall 32 is spaced apart from the flow path component 28 to form an inner gap 74 between the radially outwardly-facing mating surface 70 of the inner endwall 32 and the radially inwardly-facing mating surface 62 of the flow path component 28.

In the illustrative embodiment, the inner endwall 32 is formed to include a receiver aperture 76 that extends between the radially outwardly-facing and radially inwardly-facing mating surfaces 70, 72 of the inner endwall 32 as shown in FIG. 3. The receiver aperture 76 is sized to receive an inner end 86 of the reinforcement spar 36 as shown in FIGS. 4A and 4B.

Figure 6A:
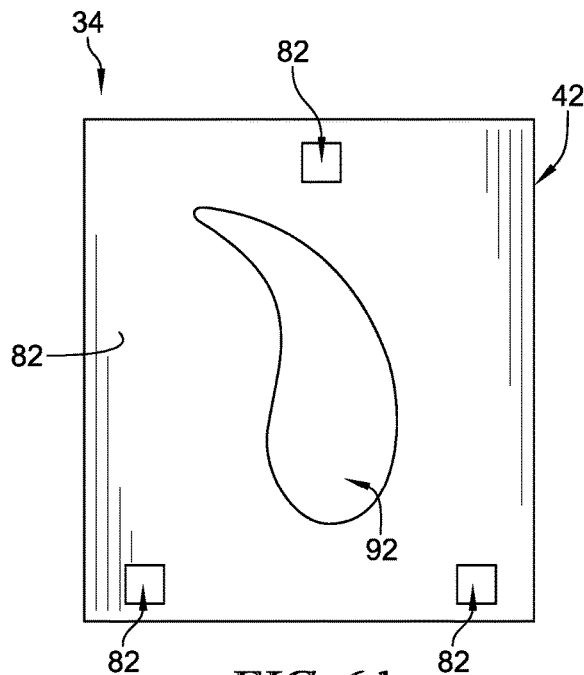
FIG. 6A is an elevation view of the inner compliant member of FIG. 3.
Figure 6B:
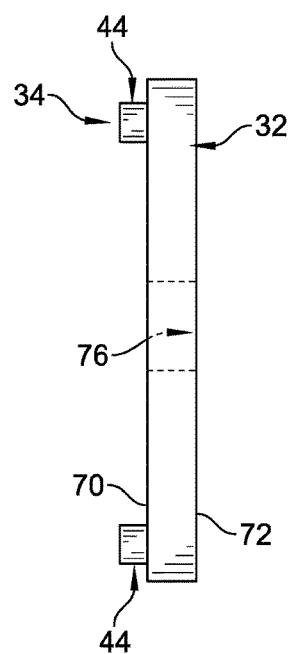
FIG. 6B is a side elevation view of the inner endwall of FIG. 3 and a plurality of load pads configured to be received in the inner compliant member of FIG. 6A.

The inner load-distribution system 34 is configured to be located in the inner gap 74 between the inner endwall 32 and the inner flange 56 of the flow path component 28 as shown in FIGS. 3, 4A, and 4B. The illustrative inner load-distribution system 34 includes the inner compliant member 42 and the plurality of inner load pads 44 as shown in FIGS. 6A and 6B. The inner compliant member 42 is configured to compress when a load is applied to the compliant member 42 to distribute loads transmitted between the mating surface 70 of the inner endwall 32 and the mating surface 62 of the flow path component 28 during use of the turbine vane assembly 20. The load pads 44 are configured to limit compression of the compliant member 42 to limit movement between the inner endwall 32 and the flow path component 28. Illustratively, the inner compliant member 42 is substantially similar to the outer compliant member 38 and the load pads 44 are substantially similar to the load pads 40.

The inner compliant member 42 includes an inner radial surface 78 and an outer radial surface 80 spaced apart radially from the inner radial surface 78 as shown in FIG. 3. The outer radial surface 80 is configured to engage the mating surface 62 of the inner flange 56. The inner radial surface 78 is configured to engage the outer mating surface 70 of the inner endwall 32. When no load is applied to the compliant member 42, the compliant member 42 has an uncompressed thickness defined between the inner radial surface 78 and the outer radial surface 80. The illustrative compliant member 42 is formed to include a plurality of receiver apertures 82 as shown in FIG. 6A. Each receiver aperture 82 is shaped to receive one of the load pads 44. In the illustrative embodiment, the inner compliant member 42 is formed to include an aperture 92 sized to receive the spar 36.

The load pads 44 are positioned between the mating surfaces 62, 70 as shown in FIG. 3. Each load pad 44 has a thickness that is less than the uncompressed thickness of the compliant member 42 as shown in FIGS. 4A and 4B. In the illustrative embodiment, the load pads 44 are rigid load pads which comprise metallic material, for example, nickel or cobalt based alloys. In the illustrative embodiment, the inner load-distribution system 34 includes at least three load pads 44 to locate the flow path component 28 in three-dimensional space.

In some embodiments, the load pads 44 and the inner endwall 32 are monolithically formed. In other embodiments, the rigid load pads 44 are coupled to the inner endwall 32 as shown in FIG. 6B. In other embodiments, the rigid load pads 44 are coupled to the flow path component 28. In other embodiments, the load pads 44 are not coupled with either the inner endwall 32 or the flow path component 28.

In some embodiments, the outer endwall 26, the inner endwall 34, and the compliant members 38, 42 are rectangular shaped as shown in FIG. 7. In other embodiments, the outer endwall 26, the inner endwall 34, and the compliant members 38, 42 are trapezoidal shaped.

Illustratively, the reinforcement spar 36 is made from a metallic material and extends from the outer endwall 26 through the hollow core 65 of the flow path component 28 as shown in FIG. 4A. The reinforcement spar 36 engages the interior surface 63 of the flow path component 28 so that some aerodynamic loads applied to the flow path component 28 are transferred directly to the outer endwall 26 as shown in FIGS. 4A and 4B. The reinforcement spar 36 includes an outer end 84 arranged to extend into the receiver aperture 52 of the outer endwall 26 and an inner end 86 arranged to extend into a receiver aperture 76 of the inner endwall 32 to couple the spar 36 to the outer and inner endwalls 26, 32.

During operation of the gas turbine engine 10, relative growth between the endwalls 26, 32 and the flow path component 28 may occur due to the materials, shape, and temperature of the endwalls 26, 32 and the flow path component 28. The relative growth may cause pressure loads to be applied through the turbine vane assembly 20 as suggested in FIGS. 4A and 4B. In vane assemblies without the load-distribution systems 30, 34, the pressure loads acting on the flow path component 28 may form areas of localized stress. As such, the localized areas of stress may damage and/or break the flow path component. Alternatively, the flow path component may be reinforced in some way to withstand the localized stress. However, reinforcing the flow path component may limit other design choices such as, for example, the material, weight, and shape of the flow path component.

In the illustrative embodiment, the load-distribution systems 30, 34 distributes the forces acting on the turbine vane assembly 20 to lower any areas of localized stress as suggested in FIGS. 4A and 4B. The load-distribution systems 30, 34 may help maintain multiple defined contact sites on the flow path component 28 through a range of temperatures experienced during operation of the turbine vane assembly 20 as the endwalls 26, 32 and the flow path component 28 expand and contract.

The forces acting on the turbine vane assembly 20 cause the endwalls 26, 32 to move radially toward the flow path component 28 and partially compress the compliant members 38, 42 as shown in FIG. 4A. The partially compressed compliant members 38, 42 distribute a portion of the forces across the flow path component 28 to lower any areas of localized stress.

As the forces acting on the turbine vane assembly 20 grow, relative movement between the flow path component 28 and the endwalls 26, 32 cause the compliant members 38, 42 to compress further as shown in FIG. 4B. In response, the compliant members 38, 42 distribute the additional forces. If the forces continue to increase, the compliant members 38, 42 fully compress and the load pads 40, 44 engage the mating surfaces 60, 62 of the flow path component 28 respectively to block further radial movement of the endwalls 26, 32 relative to the flow path component 28.

If the forces acting on the turbine vane assembly 20 continue to grow after the compliant members 38, 42 are fully compressed, the additional force load is transmitted through the load pads 40, 44 and the forces transmitted through the compliant members 38, 42 remain generally constant. The load pads 40, 44 may be located relative to the flow path component 28 and the endwalls 26, 32 to cause the load pads 40, 44 to engage the predetermined areas of the flow path component 28 and the endwalls 26, 32. When the forces acting on the turbine vane assembly 20 decrease, the forces transferred through the compliant members 38, 42 remain generally constant until the forces decrease such that the load pads 40, 44 fully unload.

In the illustrative embodiment, the assembly segment 22 includes the outer load-distribution system 30 and the inner load-distribution system 34. In other embodiments, the assembly segment 22 includes only one load-distribution system.

Figure 7A:
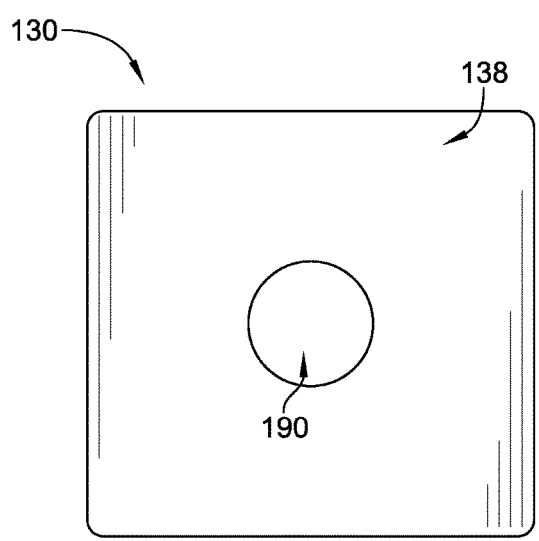
FIG. 7A is an elevation view of another embodiment of a compliant member for use with the gas turbine engine of FIG. 1.
Figure 7B:
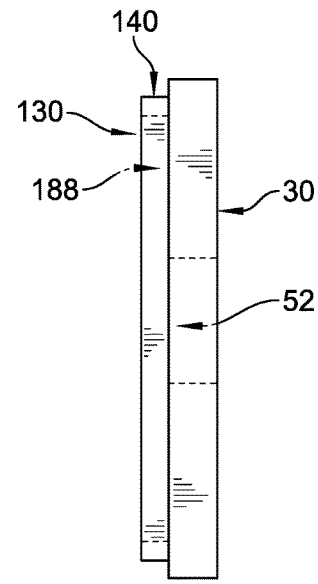
FIG. 7B is an elevation view of another embodiment of a load pad for use with the gas turbine engine of FIG. 1, the load pad configured to be located between the endwall and the flow path component and formed to receive the compliant member of FIG. 7A.

Another illustrative load-distribution system 130 adapted for use in the turbine vane assembly 20 is shown in FIGS. 7A and 7B. The load-distribution system 130 is substantially similar to the load-distribution system 30 shown in FIGS. 1-6B and described herein. Accordingly, similar reference numbers in the 100 series indicate features that are common between the load-distribution system 30 and the load-distribution system 130. The description of the load-distribution system 30 is hereby incorporated by reference to apply to the load-distribution system 130, except in instances when it conflicts with the specific description and drawings of the load-distribution system 130.

The load-distribution system 130 may be used as an outer load-distribution system or an inner load-distribution system. The load-distribution system 130 includes a compliant member 138 and a rigid load pad 140 as shown in FIGS. 7A and 7B.

Illustratively, the compliant member 138 is rectangular shape as shown in FIG. 7A. The compliant member 138 is formed to include an aperture 190 sized to receive a portion of the reinforcement spar 36.

The load pad 140 includes a rigid strip of material arranged to form a compliant-member receiver aperture 188 formed to receive a portion of the compliant member 138.

A portion of the compliant member 138 is received and retained in the compliant-member receiver aperture 188 and another portion extends radially outward to lie outside the compliant-member receiver aperture 188 until the compliant member 138 is compressed due to pressure loads acting on the turbine vane assembly 20. In the illustrative embodiment, the load pad 140 is coupled to the outer endwall 26. In some embodiments, the load-distribution system 130 includes a plurality of load pads 140 that cooperate to form the compliant-member receiver aperture 188.

Figure 8A:
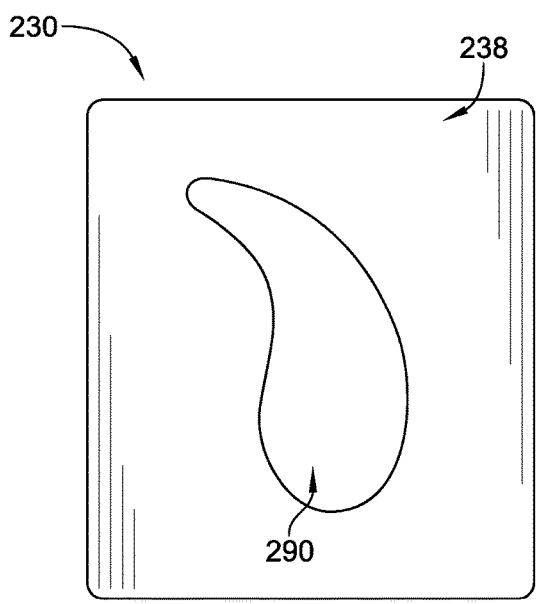
FIG. 8A is an elevation view of another embodiment of a compliant member for use with the gas turbine engine of FIG. 1.
Figure 8B:
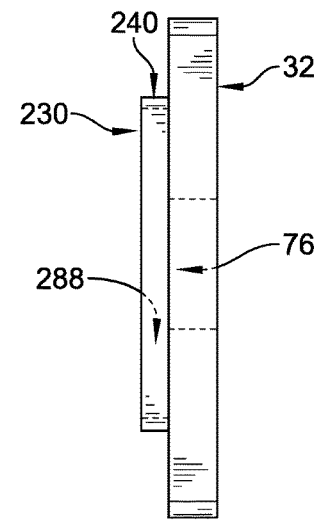
FIG. 8B is an elevation view of another embodiment of a load pad for use with the gas turbine engine of FIG. 1, the load pad configured to be located between the endwall and the flow path component and to be received by the compliant member of FIG. 8A.

Another illustrative load-distribution system 230 adapted for use in the turbine vane assembly 20 is shown in FIGS. 8A and 8B. The load-distribution system 230 is substantially similar to the load-distribution system 30 shown in FIGS. 1-6B and described herein. Accordingly, similar reference numbers in the 200 series indicate features that are common between the load-distribution system 30 and the load-distribution system 230. The description of the load-distribution system 30 is hereby incorporated by reference to apply to the load-distribution system 230, except in instances when it conflicts with the specific description and drawings of the load-distribution system 230.

The load-distribution system 230 may be used as an outer load-distribution system or an inner load-distribution system. The load-distribution system 230 includes a compliant member 238 and a rigid load pad 240 as shown in FIGS. 8A and 8B.

Illustratively, the compliant member 238 is rectangle shaped as shown in FIG. 8A. The compliant member 238 is formed to include an aperture 290 sized to receive the rigid load pad 240 and a portion of the reinforcement spar 36.

The load pad 240 includes a rigid strip of material arranged to be received in the aperture 290 of the compliant member 238 and blocks movement of the compliant member 238 relative to the load pad 240. In the illustrative embodiment, the load pad 240 is arranged in an airfoil shape. In the illustrative embodiment, the load pad 240 is coupled to the inner endwall 32. In some embodiments, the load-distribution system 230 includes a plurality of load pads 240.

Ceramic matrix composite material may be stiffer than traditional metal alloys. As a result, components made from ceramic matrix composite material can concentrate loads at the initial contact locations rather than distributing the contact load across an entire surface. The load-distribution system disclosed herein may be used with ceramic matrix composite vanes. For example, the system could be used with ceramic matrix composite airfoils and endwalls having metal structures on either end constraining and locating the vane. The compliant layer may be used between the ceramic matrix composite vane endwalls and the constraining metal pieces. The compliant layer(s) may provide inherent centering, distribute contact loads, accommodate relative thermal growth, and/or provide sealing around the top of the airfoil to enable secondary flow cooling schemes.

As another example, the load-distribution system may be used with a turbine shroud. For example, the turbine shroud includes a carrier comprising metallic materials, a blade track comprising ceramic matrix composite materials, and a load-distribution located therebetween. Contact between the components may occur at the three highest points of the blade track and would not be spread across the whole length of the blade track. If the locations of those three high points happened to be at undesired locations, then high stresses may be located at those locations. For comparison, metal segments tend to deflect as they are loaded such that the load is roughly spread evenly along the whole hanger surface. To address this issue, three discrete load points may be used to ensure the contact points are known and controlled. In some turbine shrouds, the mating surfaces are machined such that there are three slightly raised pads that contact at predefined locations. One example of such turbine shroud is described in U.S. patent application Ser. No. 15/065,256 filed 9 Mar. 2016, which is hereby incorporated by reference in its entirety.

The load pads are oriented axially for deterministic contact at optimum locations regardless of tolerances or movement (flattening) during operation. The load pads definitively locate the segment and the flowpath to better control blade tip clearance. The compliant member allows relatively constant load distribution throughout operation and assembly. This lowers some of the load from the load pads, which relieves some of the associated stresses from localized load transfer.

The compliant layer may need to survive at high temperatures when used with ceramic matrix composite components. The ceramic matrix composite materials may be used due to their high temperature capability. As such, temperatures at mating surfaces may be relatively hot. As a result, traditional compliant materials such as rubber may not be suitable. The use of a compliant layer between mating components can distribute the load. In this way, distributed loads may be achieved despite stiff materials like ceramic matrix composite materials and despite form tolerances on the surfaces.

A few examples of candidate materials for the compliant layer would be 3M™ INTERAM® material, graphoil, and micaboard gasket material. Other high temperature gasket type materials may also be of use. These materials may take permanent and temporary set, but may retain some resiliency at temperature to accommodate slight changes in mating surface form (such as flattening). If temperatures and/or loads are too high, then the compliant layer material may not be durable and/or resilient enough to distribute the load throughout the entire life of the engine.

These compliant materials can be placed between the mating surfaces to provide the desired load distribution. The compliant layer may be positioned between entire mating surfaces or may include discrete load points, but compresses a compliant layer across the rest of the surfaces.

In some embodiments, if temperatures and loads can be handled by the compliant layer, then a compliant member with no load pads may be used. The compliant layer material would be used between the mating surfaces to make up for the stiffness, surface roughness, and/or form tolerances of the ceramic matrix composite material.

In some embodiments, if temperatures and loads are too high for the compliant layer alone or if more definitive location is required, then the use of discrete load pads in conjunction with the compliant layer may be used to distribute some of the load while protecting the compliant layer from over loading. This solution may result in stress levels below those found with only discrete load points but higher than a nicely distributed load across the entire surface.

The load-distribution system limits the amount of load in the compliant layer and changes the loading of the compliant layer from load controlled to strain controlled. The height of the raised pads for the load points would be less than the compliant layer thickness. In this way, initial contact is between the compliant layer and the mating surfaces. As the parts are loaded, the compliant layer is compressed until the discrete load pads are contacted. During this time, any tolerance in the mating surface form has little impact on the load distribution due to the relatively low stiffness of the compliant layer.

The load to compress the compliant layer before contacting the load points may be the amount of load distributed across the remainder of the surface. This is load which does not need to be transferred at the discrete load points. In this manner, some of the load can be well distributed while being kept at levels which the compliant layer can withstand.

The amount of compression in the compliant layer may remain generally fixed throughout the operating envelope of the engine. As loads through the interface change during operation, the load at the discrete load points will increase and decrease. Due to the high stiffness at the discrete load points, these locations may need to fully unload before the compliant layer would start to be unloaded. In this manner, the amount of compression in the compliant layer may be essentially fixed throughout the operating envelope, resulting in much less variation in load throughout the operating envelope. This may enable greater life in the compliant layer while distributing some of the load, reducing stress in the ceramic matrix composite part.

Another benefit of the discrete load points may also be to control the relative location of the mating components throughout a range of loading. In one example, changes in the compliant layer thickness may result in a change in turbine blade tip clearance (which can greatly affect turbine efficiency). Without the load points, the relatively low stiffness of the compliant layer may change a gap between mating components as the loading on the parts changes. If this gap is in the tip clearance stack up, a change in the compliant layer thickness may change the tip clearance. By introducing the discrete load points, some of the load may be distributed (lowering ceramic matrix composite stresses) but the change in relative location between mating components may remain generally fixed over a range of loads.

The compliant layer may provide an additional function of sealing at the joint. This could reduce leakage rates, thereby improving specific fuel consumption, and it may allow flow to be controlled by features that can more reliably meter flow, thereby reducing variability in cooling flows (improved durability and/or specific fuel consumption). Micaboard and other high temperature gasket materials may be used to both distribute load and seal the joint.

In some embodiments, the compliant layer may be made from 3M™ INTERAM® (MatMount), micaboard gasket material, or other high temperature gasket materials. In some embodiments, the discrete load points may be used along with a compliant layer. In some embodiments, the load is transferred through the compliant layer.

Vibration, relative motion, exposure to hot gas flow, etc. may lead to deterioration of the compliant layer. In some embodiments, the compliant layer is coated. An edge and/or surface of the layer may be coated with a protective coating. In some embodiments, the surface finish is controller to improve durability of the compliant layer in a vibratory environment or with relative motion. In some embodiments, the compliant layer is located between two pieces of metal foil. In this manner, the metal foil may be the portion of the compliant layer exposed to relative motion, high velocity gas flow, etc.

The load-distribution system may be useful in distributing loads in ceramic matrix composite seal segment applications. This may be applied to a hanger style seal segment. In other embodiments, the load-distribution system may be used to replace a linear wave spring. The wave spring may be susceptible to creep and may be expensive. The compliant layer may improve load distribution due to lower relative stiffness and due to the removal of discrete load lines.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for use in a gas turbine engine, the turbine vane assembly comprising
a metallic outer endwall arranged around at least a portion of a central axis of the turbine vane assembly, the outer endwall having a first mating surface facing radially-inward toward the central axis,
a flow path component comprising ceramic material and having a second mating surface facing radially-outward away from the central axis and arranged to face the first mating surface, the second mating surface being spaced apart from the first mating surface to define an outer gap therebetween,
an outer compliant member located in the outer gap between the first and second mating surfaces, the outer compliant member being configured to compress to reduce a size of the outer gap in response to pressure loads acting on the outer endwall and the flow path component and to distribute the pressure loads between the first mating surface of the outer endwall and the second mating surface of the flow path component during use of the turbine vane assembly, and
a plurality of outer load pads located in the outer gap between the first and second mating surfaces, the plurality of outer load pads being rigid and each of the plurality of outer load pads having a fixed first load-pad thickness in a radial direction to limit relative movement between the first mating and second mating surfaces to maintain a minimum distance between the first and second mating surfaces, the minimum distance is greater than or equal to the fixed first load-pad thickness.

2. The turbine vane assembly of claim 1, further comprising a metallic inner endwall arranged around at least a portion of the central axis of the turbine vane assembly, the inner endwall includes a third mating surface facing radially-outward away from the central axis, the flow path component further includes a fourth mating surface facing radially-inward toward the central axis and arranged to face the third mating surface, and the fourth mating surface is spaced apart from the third mating surface to define an inner gap therebetween.

3. The turbine vane assembly of claim 2, further comprising an inner compliant member located in the inner gap between the third and fourth mating surfaces, the inner compliant member being configured to compress to reduce a size of the inner gap in response to loads acting on the inner endwall and the flow path component during use of the turbine vane assembly.

4. The turbine vane assembly of claim 3, further comprising a plurality of inner load pads located in the inner gap between the third and fourth mating surfaces, the plurality of inner load pads being rigid and having a second load-pad thickness to limit relative movement between the third and the fourth mating surfaces to maintain a minimum distance between the third and fourth mating surfaces.

5. The turbine vane assembly of claim 1, further comprising a reinforcement spar made from a metallic material that extends from the outer endwall through a hollow core of the flow path component and engages an interior surface of the flow path component so that some aerodynamic loads applied to the flow path component are transferred directly to the outer endwall.

6. The turbine vane assembly of claim 1, wherein the flow path component includes an inner flange, an outer flange located in spaced apart relation to the inner flange, and an airfoil extending between and interconnecting the inner and outer flanges.

7. The turbine vane assembly of claim 1, wherein the plurality of outer load pads includes at least three load pads so that the flow path component is located in three dimensions relative to the metallic outer endwall when both the metallic outer endwall and the flow path component engage the load pads.

8. A turbine vane assembly comprising
an endwall arranged around a central axis of the turbine vane assembly,
a flow path component spaced apart from the endwall, and
a load-distribution system positioned between the endwall and the flow path component, the load-distribution system engaged with the endwall and the flow path component and configured to distribute loads transmitted between the flow path component and the endwall, the load-distribution system including a load pad and a compliant member, wherein the compliant member is configured to compress from a first thickness to a second thickness that is smaller than the first thickness in response to loads transmitted between the endwall and the flow path component and the load pad has a fixed radial thickness and is configured to block relative movement between the endwall and the flow path component when the compliant member is compressed to the second thickness.

9. The turbine vane assembly of claim 8, wherein the flow path component includes an inner flange, an outer flange located in spaced apart relation to the inner flange, and an airfoil extending between and interconnecting the inner and outer flanges; and the load-distribution system is positioned between the endwall and one of the inner and outer flanges.

10. The turbine vane assembly of claim 9, wherein the compliant member includes a radial inner surface and a radial outer surface spaced apart from the radial inner surface and the compliant member is formed to include a receiver aperture that extends between the inner and outer radial surfaces and receives the load pad.

11. The turbine vane assembly of claim 10, wherein the load pad includes a rigid strip of material arranged in an airfoil shape.

12. The turbine vane assembly of claim 9, wherein the load pad is formed to define a compliant-member receiver aperture sized to receive a portion of the compliant member.

13. The turbine vane assembly of claim 8, further including at least three load pads.

14. The turbine vane assembly of claim 8, further comprising a reinforcement spar made from a metallic material that extends through the endwall, the compliant member, and a hollow core of the flow path component and engages an interior surface of the flow path component so that some loads applied to the flow path component are transferred directly to the endwall.

15. The turbine vane assembly of claim 8, wherein the compliant member is characterized in that a compliance of the compliant member is greater than that of the endwall and the flow path component.

16. A method of assembling a turbine vane assembly for use in a gas turbine engine, the method comprising locating a first load-distribution system between a flow path component and a first endwall arranged around a central axis of the turbine vane assembly, the first load-distribution system including a compliant member and a rigid load pad having a fixed radial thickness and being configured to engage the flow path component and the first endwall, inserting a reinforcement spar through the first endwall and a hollow core of the flow path component to cause the reinforcement spar to engage an interior surface of the flow path component, the reinforcement spar being made from a metallic material, and coupling the reinforcement spar to the first endwall.

17. The method of claim 16, further comprising locating a second load-distribution system between the flow path component and a second endwall arranged around the central axis of the turbine vane assembly and the second load-distribution system includes a compliant member and a rigid load pad having a fixed radial thickness.

18. The method of claim 16, wherein the compliant member is formed to include a receiver aperture extending through the compliant member and the receiver aperture is sized to receive the reinforcement spar.

19. The method of claim 18, wherein the rigid load pad is shaped to extend around a perimeter edge of the receiver aperture.

20. The method of claim 19, wherein the receiver aperture is airfoil shaped.

* * * * *